(12) United States Patent
Cohen et al.

(10) Patent No.: US 10,906,013 B2
(45) Date of Patent: Feb. 2, 2021

(54) GAS CANISTER CONNECTOR WITH INSERTION LIMITER

(71) Applicant: Sodastream Industries Ltd., Lod (IL)

(72) Inventors: Avi Cohen, Jerusalem (IL); Allan Ring, Mercaz Shapira (IL)

(73) Assignee: Sodastream Industries Ltd., Kfar Saba (IL)

( * ) Notice: Subject to any disclaimer, the term of this patent is extended or adjusted under 35 U.S.C. 154(b) by 167 days.

(21) Appl. No.: 16/392,970

(22) Filed: Apr. 24, 2019

(65) Prior Publication Data

US 2020/0338507 A1    Oct. 29, 2020

(51) Int. Cl.
*B01F 3/04*    (2006.01)
*A23L 2/54*    (2006.01)

(52) U.S. Cl.
CPC ...... *B01F 3/04829* (2013.01); *B01F 3/04794* (2013.01); *B01F 3/04801* (2013.01); *A23L 2/54* (2013.01); *B01F 2003/049* (2013.01); *B01F 2215/0022* (2013.01)

(58) Field of Classification Search
CPC .............. B01F 3/04829; B01F 3/04801; B01F 3/04787; B01F 3/04794; A23L 2/54
See application file for complete search history.

(56) References Cited

U.S. PATENT DOCUMENTS 4,712,713 A * 12/1987 Karlis ................. B01F 3/04794
222/3

FOREIGN PATENT DOCUMENTS

EP         0946273 B1    8/2003
WO    WO 9825485 A2    6/1998

OTHER PUBLICATIONS

The International Search Report and the Written Opinion for PCT Application No. PCT/IL2020/050464, dated Jun. 24, 2020.

* cited by examiner

*Primary Examiner* — Robert A Hopkins
(74) *Attorney, Agent, or Firm* — Pearl Cohen Zedek; Latzer Baratz LLP

(57) ABSTRACT

A connector for connecting a gas canister to a carbonation machine includes holding structure with a threaded socket that is configured to hold an exteriorly threaded valve head that is screwed into the socket to enable operation of a gas release mechanism of the carbonation machine to release a gas from the gas canister. A rotatable projection extends distally from the holding structure and that is configured to engage cooperating structure on the gas canister. When the valve head is fully inserted into the socket, a gasket in the socket is sufficiently compressed to prevent escape of the gas between the valve head and the socket when the gas is released from the gas canister compression while overtightening damage to the gasket is prevented.

8 Claims, 3 Drawing Sheets

GAS CANISTER CONNECTOR WITH INSERTION LIMITER

FIELD OF THE INVENTION

The present invention relates to carbonation machines. More particularly, the present invention relates to gas canister connector of a carbonation machine with an insertion limiter.

BACKGROUND OF THE INVENTION

Carbonation machines are commonly used in homes, offices, cafeterias, and other settings. A typical carbonation machine may be operated to inject carbon dioxide into water or another liquid that is in a bottle that may be attached to the machine. Other types of carbonation machines may be configured to dispense carbonated beverages into cups or other containers.

The carbon dioxide gas that is injected into liquid to carbonate the liquid is typically provided in cylinders of compressed or liquefied gas. The carbonation machine includes a user-operable mechanism for releasing gas from the cylinder and conducting the gas to the liquid to be carbonated. Typically, operation of the gas release mechanism causes the mechanism to open a valve of the cylinder. When the gas canister is installed in the carbonation machine, a valve head that includes the valve is connected to a gas canister connector of the carbonation machine.

When a cylinder has been emptied of gas, the empty cylinder may be replaced with a full cylinder. This replacement is typically performed by a user of the machine. For example, a valve head of the cylinder may be provided with exterior male threading which may be connected to the gas canister connector by screwing into interior threading of a socket of the connector.

SUMMARY OF THE INVENTION

There is thus provided, in accordance with an embodiment of the invention, a connector for connecting a gas canister to a carbonation machine, the connector including: holding structure including a threaded socket that is configured to hold an exteriorly threaded valve head that is screwed into the socket to enable operation of a gas release mechanism of the carbonation machine to release a gas from the gas canister to which the valve head is connected; and a rotatable projection that extends distally from the holding structure and that is configured to engage cooperating structure on the gas canister such that when the valve head is fully inserted into the socket, a gasket in the socket is sufficiently compressed to prevent escape of the gas between the valve head and the socket when the gas is released from the gas canister compression while preventing overtightening damage to the gasket.

Furthermore, in accordance with an embodiment of the invention, the projection is configured such that when the valve head is fully inserted into the socket, operation of a gas release mechanism of the carbonation machine opens a valve of the valve head to release the gas from the gas canister.

Furthermore, in accordance with an embodiment of the invention, the projection includes a ring that at least partially surrounds the socket.

Furthermore, in accordance with an embodiment of the invention, the ring is configured to engage a ledge of the valve head when the valve head is fully inserted into the socket.

Furthermore, in accordance with an embodiment of the invention, the ring is configured to rotate when the valve head is rotated when being screwed into the socket.

Furthermore, in accordance with an embodiment of the invention, the ring includes a gap configured to accommodate a lateral projection from the valve head when the valve head is being inserted into the socket.

Furthermore, in accordance with an embodiment of the invention, the lateral projection includes a burst disk plug that is configured to hold a burst disk in place within the valve head.

There is further provide, in accordance with an embodiment of the invention, a carbonation machine including: a gas release mechanism that is operable to release gas from a gas canister that is held in the carbonation machine; a carbonation head configured to inject the gas that is released from the gas canister into a bottle that is held by the carbonation head; and a connector for connecting the gas canister to the carbonation machine, the connector including a threaded socket that is configured to hold an exteriorly threaded valve head of the gas canister when the valve head is screwed into the socket such that operation of the gas release mechanism releases the gas from the gas canister to flow to the carbonation head, and a rotatable projection that extends distally from the holding structure and that is configured to engage cooperating structure on the gas canister such that when the valve head is fully inserted into the socket, a gasket in the socket is sufficiently compressed to prevent escape of the gas between the valve head and the socket when the gas is released from the gas canister compression while preventing overtightening damage to the gasket.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1A:
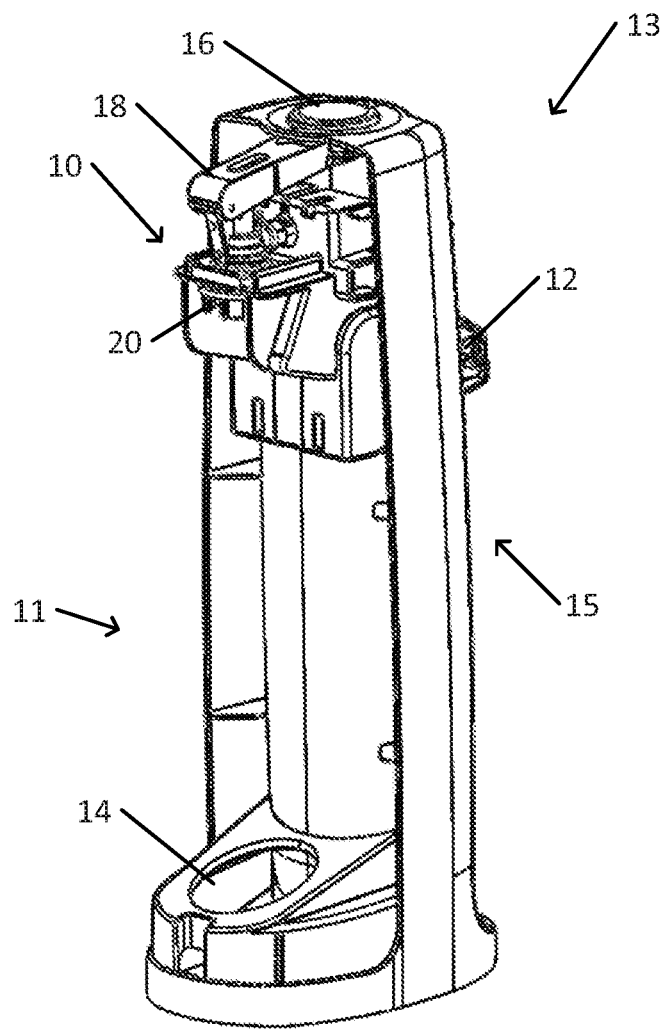
FIG. 1A schematically illustrates an example of a gas canister compartment of a carbonation machine with a gas canister connector that includes an overtightening protection ring.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a gas canister connector of a carbonation machine is provided with structure to limit insertion of an end of the gas canister into the connector. Where an end of the gas canister is screwed into the connector, the insertion limiting structure may prevent overtightening when the gas canister (e.g., having a cylindrical shape or another shape) is screwed into the canister connector. The gas canister connector includes holding structure that holds the gas canister to the carbonation machine. When the gas canister is connected to the carbonation machine, an operation mechanism of the carbonation machine (e.g., mechanically operated or motorized) may open a valve on the gas canister to release gas (e.g., carbon dioxide) from the gas canister. The released gas may flow via one or more conduits to a carbonation head that is configured to inject the released gas into water or another liquid.

For example, the holding structure of the gas canister connector may include a socket with interior threading. The gas canister may be connected to the gas canister connector by screwing exterior threading on a valve head of the gas canister into the threading of the socket. In other examples, the valve head may be pushed into or otherwise inserted into, or connected to, the gas canister connector. In these other examples, the holding structure may include one or more latches, a bayonet mount, a retaining ring or slot, or other structure for holding the gas canister to the gas canister connector.

Typically, connection of a gas canister to the gas canister connector of a carbonation machine is simple enough to be performed by an unskilled user. However, an unskilled user may not be familiar with limitations of the machine. In some configurations of a gas canister connector, e.g., when the gas canister connector includes a socket with interior threading, a user who is attaching the gas canister may overtighten the connection.

For example, a user who is screwing a valve head of the gas canister into a socket of the gas canister connector may apply excessive torque to the cylinder. Such excessive torque may damage parts of the machine. For example, where threading of the socket is constructed of a plastic while the threading of the valve head is constructed of a metal, such excessive torque may strip the interior threading from the socket. Typically, a sealing gasket is inserted between the end of the valve head of the cylinder and the interior of the socket. In this case, overtightening the valve head may excessively compress, and possibly damage, the gasket. In addition, in some cases, overtightening may impede removal of the gas canister from the gas canister connector at a later date (e.g., when the inserted gas canister empties).

An overtightening protector for a gas canister connector may be in the form of one or more projections that extend from the gas canister connector, or from another part of holding structure for holding a gas canister. When the valve head of the gas canister is fully inserted into the gas canister connector, the projections may contact cooperating structure of the valve head or gas canister. The contact with the cooperating structure may prevent or limit further insertion of the valve head into the gas canister connector. For example, full insertion may correspond to a configuration where a sealing gasket is sufficiently compressed to ensure a sufficiently (e.g., in accordance with predetermined criteria for maximum allowable flow rate of gas between the valve head and the gas canister connector) gastight seal between the valve head and the gas canister connector. The full insertion may be defined such that further insertion of the valve head into the gas canister connector may risk damaging the gasket or other structure of the gas canister connector.

For example, the projections of an overtightening protector for a gas canister connector may be in the form of a full or partial overtightening prevention ring that is located about a socket of the gas canister connector. For example, the overtightening prevention ring may be aligned coaxially with the socket and fully or partially surround the perimeter of the socket. The diameter of the overtightening prevention ring is at least sufficiently large so as to not impede insertion into the socket of that distal (e.g., to a cylinder to which the valve head is attached) part of the valve head that is designed for insertion into the socket. The length of the overtightening prevention ring is designed such that when the end of the valve head is fully inserted into the socket, a distal edge of the ring contacts cooperating structure of the valve head. For example, the cooperating structure may include a ledge, step, flange, or shoulder of the valve head. In some cases, the cooperating structure may be formed by a recess or other sharp reduction in diameter of in a distal portion of the valve head.

In some cases, an overtightening prevention ring may be configured to rotate as a threaded end of a valve head of a gas canister is screwed into a socket of the gas canister connector. For example, the overtightening prevention ring may include structure to engage corresponding structure of the valve head. In one example, the overtightening prevention ring may include one or more slots that each forms a gap in the perimeter of the overtightening prevention ring. A lateral projection of the valve head, e.g., a bolt head, may fit into one of the slots of the overtightening prevention ring. Engagement of the slot by the lateral projection may facilitate alignment of the overtightening prevention ring with one or more indentations of the valve head that form cooperating structure in the form of a ledge that may be engaged by the overtightening prevention ring. As the threaded distal end of the valve head is being screwed into the socket, the lateral projection engages the slot. Therefore, a torque that is applied to the gas cylinder and valve head to rotate the valve head to cause the valve head to be screwed into the socket may be applied by the projection to the overtightening prevention ring to cause the overtightening prevention ring to rotate together with the valve head and the gas canister. Therefore, the overtightening prevention ring may continue to be aligned with the cooperating structure of the valve head as the distal end of the valve head is inserted into the socket. Therefore, when the end of the valve head is fully inserted into the socket, engagement of the cooperating structure by the overtightening prevention ring may prevent further insertion of the valve head into the socket.

The overtightening prevention ring may be constructed of a plastic, metal, ceramic, or other suitable material. For example, the overtightening prevention ring, holding structure for holding the overtightening prevention ring, or both may be made of, or may be coated with, a material (e.g., a friction-reducing polymer) that is configured to reduce friction between the overtightening prevention ring and the holding structure.

In some cases, the overtightening prevention ring may be replaceable. For example, the overtightening prevention ring, holding structure, or both may be sufficiently flexible to enable removal of the overtightening prevention ring from the holding structure and replacement of the same or a different overtightening prevention ring into the holding structure. The overtightening prevention ring, the holding structure, or both may be sufficiently resilient such that when the overtightening prevention ring, the holding structure holds the replaced overtightening prevention ring in place.

Alternatively or in addition to an overtightening prevention ring, the overtightening protector may include one or more other types of projections or structure for preventing insertion of more than a predetermined length of the valve head into the gas canister connector.

Figure 1B:
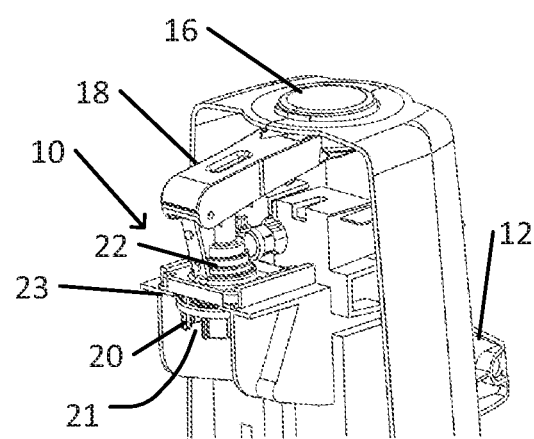
FIG. 1B schematically illustrates the gas canister connector of the gas canister compartment shown in FIG. 1A.

FIG. 1A schematically illustrates an example of a gas canister compartment of a carbonation machine with a gas canister connector that includes an overtightening protection ring. FIG. 1B schematically illustrates the gas canister connector of the gas canister compartment shown in FIG. 1A.

Figure 2A:
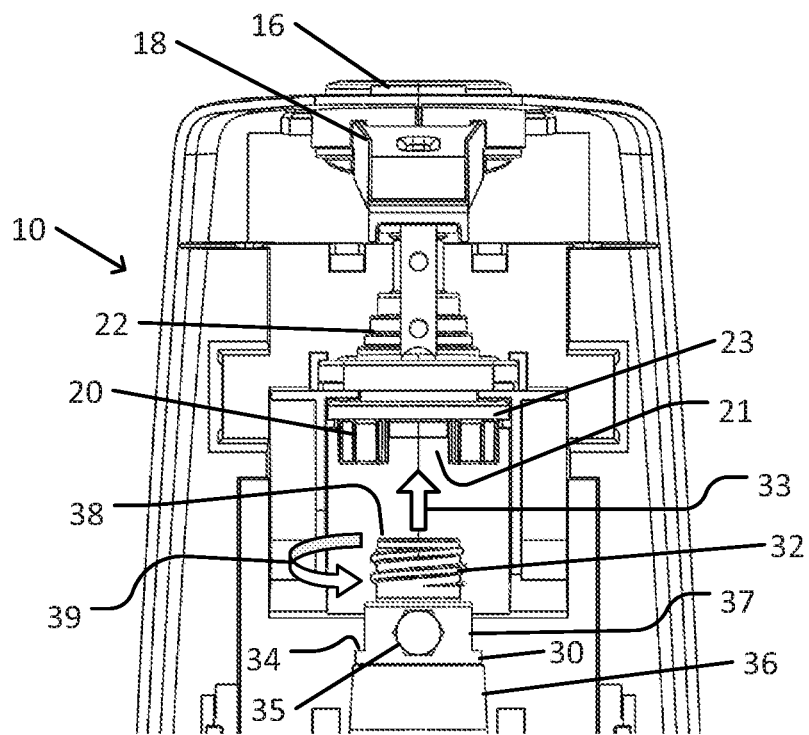
FIG. 2A schematically illustrates connection of a gas canister to the gas canister connector shown in FIG. 1B.
Figure 2B:
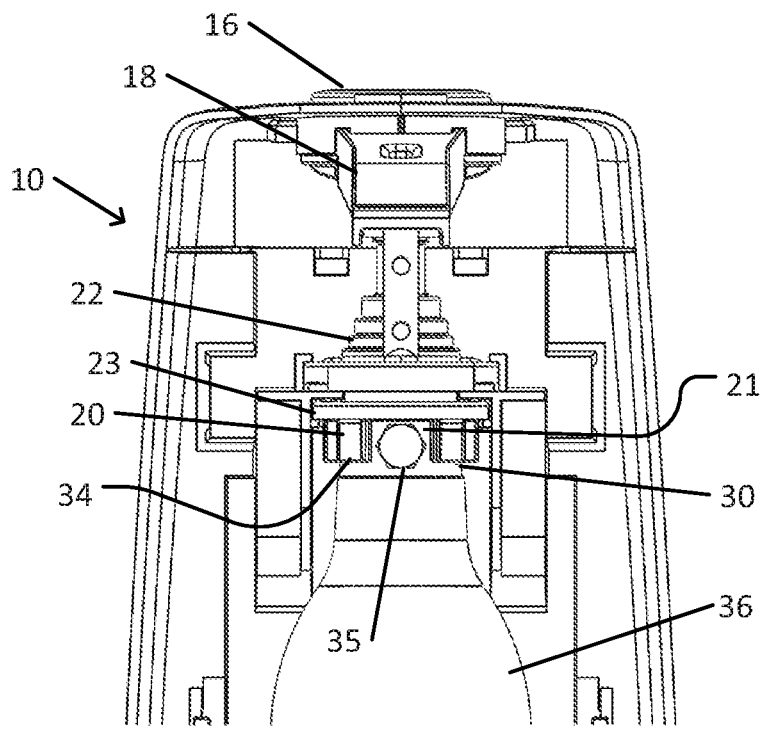
FIG. 2B schematically illustrates a gas canister fully inserted into the gas canister connector shown in FIG. 2A.

Gas canister compartment 11 of carbonation machine 13 is configured to hold a gas canister 36 (e.g., as shown in FIG. 2B). A valve head 30 (e.g., as shown in FIG. 2B) of gas canister 36 may be connected to gas canister connector 10 of the carbonation machine. A gas canister 36 that is connected to gas canister connector 10 may extend downward into opening 14 at the bottom of gas canister compartment 11. Typically, after a gas canister 36 is connected to gas canister connector 10, gas canister compartment 11 may be covered with a cover (not shown) that fits over gas canister 36 and gas canister compartment 11.

When a gas canister is connected to gas canister connector 10, gas release control 16 may be operated (e.g., depressed or otherwise operated) by a user. Operation of gas release control 16 may cause gas release mechanism 18 to operate valve head 30 to release pressurized gas (e.g., carbon dioxide or another gas) from gas canister 36. The gas that is released by operation of gas release mechanism 18 may flow through one or more conduits to carbonation head 12. A bottle (not shown) that contains a liquid (e.g., water or another liquid) may be held in bottle compartment 15 of carbonation machine 13 and may be attached to carbonation head 12. The released gas that flows to carbonation head 12 may be directed to and injected into a bottle that is connected to carbonation head 12 so as to carbonate the liquid contents of the bottle.

In the example shown, gas canister connector 10 includes a valve head socket 22 into which valve head 30 is insertable in order to attach gas canister 36 to gas canister connector 10. An overtightening protector in the form of overtightening protection ring 20 extends outward (downward in the example shown) from valve head socket 22.

In the example shown, overtightening protection ring 20 is in the form of a partial ring (e.g., a ring with at least one ring gap 21 in its perimeter). Also in the example shown, overtightening protection ring 20 is configured to rotate within ring holding structure 23 about an axis of rotational symmetry of valve head socket 22.

In some cases, overtightening protection ring 20, ring holding structure 23, or both may be configured to enable a user to remove overtightening protection ring 20 from ring holding structure 23, or to insert an overtightening protection ring 20 (e.g., either previously removed or a new overtightening protection ring 20) into ring holding structure 23. For example, ring holding structure 23, overtightening protection ring 20, or both may be constructed to be sufficiently flexible and resilient so as to enable an overtightening protection ring 20 to be snapped into or out of ring holding structure 23. In another example, ring holding structure 23 may include a latch, a removable or hinged section, or other component structure that may be opened to enable insertion or removal of an overtightening protection ring 20, and closed to hold overtightening protection ring 20 in place.

FIG. 2A schematically illustrates connection of a gas canister to the gas canister connector shown in FIG. 1B.

Figure 3A:
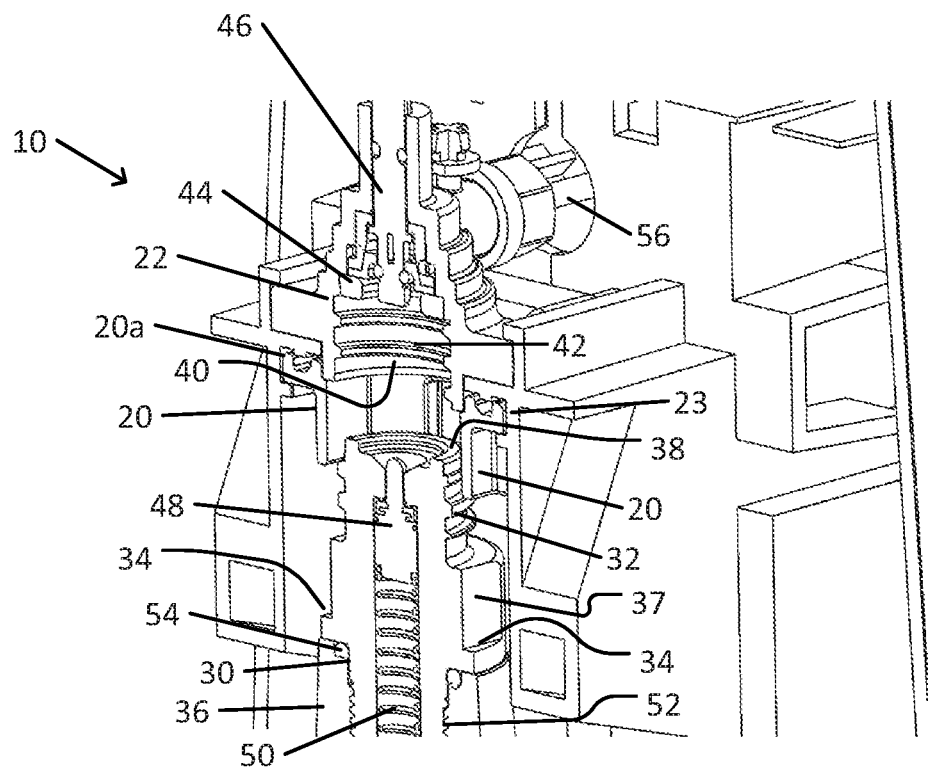
FIG. 3A is a schematic sectioned view of connection of a gas canister to the gas canister connector as shown in FIG. 2A.

In the example shown, distal (to gas canister 36) end 38 of valve head 30 is surrounded by exterior threading 32. Distal end 38 may be inserted, as indicated by arrow 33, into valve head socket 22 for connection to gas canister connector 10. For example, distal end 38 may be screwed into valve head socket 22 such that exterior threading 32 engages interior threading 42 (e.g., as shown in FIG. 3A) of valve head socket 22.

When inserting distal end 38 into valve head socket 22, one or more lateral valve head projections 35 of valve head 30 may be aligned with one or more ring gaps 21 of overtightening protection ring 20. For example, lateral valve head projection 35 may function as a burst disk plug that holds a burst disk into place within valve head 30. The burst disk may be configured to release gas in the event that the gas pressure increases beyond a maximum pressure level.

As distal end 38 is inserted into valve head socket 22, lateral valve head projection 35 may fit into ring gap 21 of overtightening prevention ring 20. The diameter of overtightening prevention ring 20 is configured such that when lateral valve head projection 35 is fit within ring gap 21, at least an inner diameter of overtightening prevention ring 20 is smaller than a distance of the distal end of lateral valve head projection 35 from an axis of rotation of valve head 30 when valve head 30 is screwed into valve head socket 22.

The alignment of lateral valve head projection 35 with ring gap 21 may enable sufficient insertion of distal end 38 into valve head socket 22 such that exterior threading 32 of valve head 30 engages interior threading 42 of valve head socket 22. Application of torque to rotate gas canister 36 and attached valve head 30 with rotation 39 may screw distal end 38 into valve head socket 22, inserting distal end 38 into valve head socket 22.

As valve head 30 is rotated with rotation 39, lateral valve head projection 35 may engage ring gap 21. Therefore, the torque that is applied to valve head 30 to rotate valve head 30 with rotation 39 may be transmitted by lateral valve head projection 35 to ring gap 21 to cause overtightening protection ring 20 to also rotate with rotation 39.

In the example shown, valve head 30 includes at least two indentations 37. For example, indentations 37 may be provided to facilitate handling or manipulation of valve head 30 by an appropriate wrench, gripper, or other tool, e.g., when connecting valve head 30 to gas canister 36. Each indentation 37 forms a ledge 34 that may be utilized as cooperating structure to be engaged by overtightening protection ring 20. In other examples, a ledge or other cooperating structure (e.g., one or more an axially oriented indentations, pits, or sockets, another type of flattening of a surface to form a ledge, or other structure that may be engaged by overtightening protection ring 20 to prevent further insertion of valve head 30 into valve head socket 22).

FIG. 2B schematically illustrates a gas canister fully inserted into the gas canister connector shown in FIG. 2A.

In the example shown, distal end 38 of valve head 30 has been screwed into valve head socket 22 to fully insert valve head 30 into valve head socket 22. When fully inserted, ledges 34 on valve head 30 have been brought into contact with overtightening protection ring 20 of gas canister connector 10. As a result of the contact of overtightening protection ring 20 with ledges 34, further insertion of distal end 38 into valve head socket 22 is prevented or limited.

In other examples, an overtightening protection ring may include only one or more projections that are configured to contact one or more ledges 34 or other structure of valve head 30 or of gas canister 36 when lateral valve head projection 35 engages ring gap 21 or other structure of the overtightening protection ring.

Full insertion of distal end 38 into valve head socket 22 when ledge 34 is contacted by overtightening protection ring 20 may be determined in accordance with one or more criteria. For example, full insertion of distal end 38 into valve head socket 22 may be selected so as to enable operation of carbonation machine 13 while protecting one or more components of gas canister connector 10 from possible damage.

FIG. 3A is a schematic sectioned view of connection of a gas canister to the gas canister connector as shown in FIG. 2A.

In the example shown, retaining lip 20a of overtightening protection ring 20 is retained within, and is rotatable within, ring holding structure 23. Therefore, overtightening protection ring 20 may be rotated within ring holding structure 23 and relative to the remainder of gas canister connector 10.

In some cases, retaining lip 20a may be sufficiently flexible and resilient so as to enable retaining lip 20a to be bent sufficiently to remove overtightening protection ring 20 from ring holding structure 23, or to insert an overtightening protection ring 20 into ring holding structure 23 to be held in place.

In the example shown, valve head 30 is attached to gas canister 36 by canister threading 52. Socket gasket 54 is configured to prevent escape of gas from gas canister 36 via an interface between valve head 30 and gas canister 36.

Socket cavity 40 of valve head socket 22 is provided with interior threading 42. The size and shape of socket cavity 40 is designed to enable insertion of distal end 38 of valve head 30. Interior threading 42 is configured to engage exterior threading 32 of valve head 30 so as to retain valve head 30 and gas canister 36 within valve head socket 22 and connected to gas canister connector 10. Socket gasket 44 is configured to form a seal between valve head 30 and gas canister connector 10. For example, socket gasket 44 may be a removable and replaceable gasket that may be inserted into valve head socket 22 prior to insertion of valve head 30 into valve head socket 22.

Gas is prevented from escaping from gas canister 36 via valve head 30 by closing of valve stem 48. Valve stem 48 is maintained in its closed position, unless opened by operation of gas release mechanism 18 as described below, by spring 50.

Distal end 38 of valve head 30 may be inserted into valve head socket 22 until overtightening protection ring 20 contacts ledges 34.

Figure 3B:
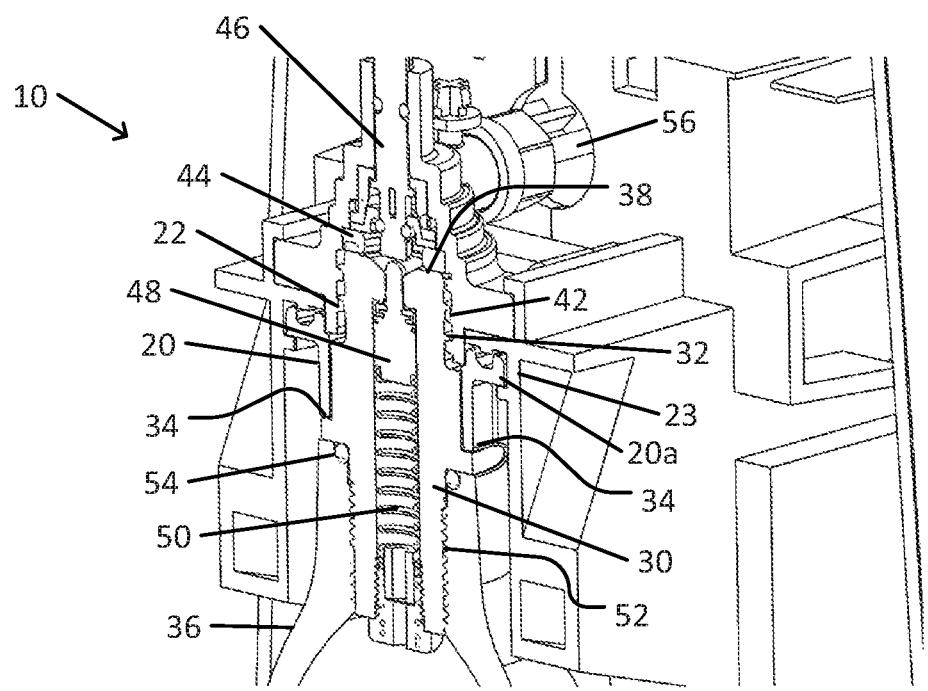
FIG. 3B is a schematic sectioned view of a gas canister fully inserted into the gas canister connector as shown in FIG. 2B.

FIG. 3B is a schematic sectioned view of a gas canister fully inserted into the gas canister connector as shown in FIG. 2B.

In the example shown, distal end 38 has been fully inserted into valve head socket 22 of gas canister connector 10. Since ledges 34 of valve head 30 contact and are pressed against overtightening protection ring 20, further insertion of valve head 30 is prevented by the contact with overtightening protection ring 20.

When distal end 38 is fully inserted into valve head socket 22, distal end 38 is pressed against socket gasket 44. Thus, socket gasket 44 may be compressed between distal end 38 of valve head 30 and valve head socket 22. The length of overtightening protection ring 20 that extends distally (to valve head socket 22) outward from retaining lip 20a may be selected so as to enable sufficient compression of socket gasket 44. When sufficiently compressed, socket gasket 44 may prevent escape of gas between distal end 38 of valve head 30 and valve head socket 22. On the other hand, the length of overtightening protection ring 20 may be selected so as to prevent potentially damaging overcompressing of socket gasket 44 between distal end 38 of valve head 30 and gasket retaining structure 45.

Full insertion of distal end 38 of valve head 30 into valve head socket 22 may be determined to enable operation of gas release mechanism 18 to release gas from gas canister 36 for conduction to carbonation head 12 via gas conduit 56.

For example, operation of gas release mechanism 18 (e.g., pressing downward on a pushbutton or handle to mechanically operate gas release mechanism 18, or operating a control to cause a motor to operate gas release mechanism 18) may press gas release shaft 46 toward valve head 30. When gas release shaft 46 contacts and pushes against valve stem 48, valve stem 48 may be depressed inward into valve head 30 and toward gas canister 36. When valve stem 48 is depressed inward, gas may be released from gas canister 36 by enabling the gas to flow around the depressed valve stem 48 and into gas canister connector 10. Socket gasket 44 closes any spaces between distal end 38 of valve head 30 and gas canister connector 10. Thus, socket gasket 44 may prevent the released gas from escaping between valve head 30 and gas canister connector 10. Therefore, the released gas may be constrained to flow into gas conduit 56 and toward carbonation head 12.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A connector for connecting a gas canister to a carbonation machine, the connector comprising:
   holding structure comprising a threaded socket that is configured to hold an exteriorly threaded valve head that is screwed into the socket to enable operation of a gas release mechanism of the carbonation machine to release a gas from the gas canister to which the valve head is connected; and
   a rotatable projection that extends distally from the holding structure and that is configured to engage cooperating structure on the gas canister such that when the valve head is fully inserted into the socket, a gasket in the socket is sufficiently compressed to prevent escape of the gas between the valve head and the socket when the gas is released from the gas canister compression while preventing overtightening damage to the gasket.

2. The connector of claim 1, wherein the projection is configured such that when the valve head is fully inserted into the socket, operation of a gas release mechanism of the carbonation machine opens a valve of the valve head to release the gas from the gas canister.

3. The connector of claim 1, wherein the projection comprises a ring that at least partially surrounds the socket.

4. The connector of claim 3, wherein the ring is configured to engage a ledge of the valve head when the valve head is fully inserted into the socket.

5. The connector of claim 3, wherein the ring is configured to rotate when the valve head is rotated when being screwed into the socket.

6. The connector of claim 5, wherein the ring includes a gap configured to accommodate a lateral projection from the valve head when the valve head is being inserted into the socket.

7. The connector of claim 6, wherein the lateral projection is configured to function as a burst disk in place within the valve head.

8. A carbonation machine comprising:
   a gas release mechanism that is operable to release gas from a gas canister that is held in the carbonation machine;
   a carbonation head configured to inject the gas that is released from the gas canister into a bottle that is held by the carbonation head; and
   a connector for connecting the gas canister to the carbonation machine, the connector comprising a threaded socket that is configured to hold an exteriorly threaded valve head of the gas canister when the valve head is screwed into the socket such that operation of the gas release mechanism releases the gas from the gas canister to flow to the carbonation head, and a rotatable projection that extends distally from the holding structure and that is configured to engage cooperating structure on the gas canister such that when the valve head is fully inserted into the socket, a gasket in the socket is sufficiently compressed to prevent escape of the gas between the valve head and the socket when the gas is released from the gas canister compression while preventing overtightening damage to the gasket.

* * * * *